United States Patent [19]

Landolt

[11] Patent Number: 4,907,685
[45] Date of Patent: Mar. 13, 1990

[54] CLUTCH FOR AUTOMOTIVE VEHICLES

[76] Inventor: Gary A. Landolt, P.O. Box 377, 112 W. Main St., Grafton, Ill. 62037

[21] Appl. No.: 302,956

[22] Filed: Jan. 30, 1989

[51] Int. Cl.⁴ .............................................. F16D 47/00
[52] U.S. Cl. .................................. 192/48.5; 192/53 R; 192/108; 192/109 R
[58] Field of Search ................... 192/48.3, 48.5, 53 R, 192/67 R, 70.19, 108, 109 R

[56] References Cited

U.S. PATENT DOCUMENTS

| | | | |
|---|---|---|---|
| 1,340,885 | 5/1920 | Fuller | 192/70.19 |
| 2,042,168 | 5/1936 | Campbell | 192/53 R |
| 2,646,691 | 7/1953 | Heisler | 192/67 R X |

OTHER PUBLICATIONS

Froslie, L. E. et al., "Automatic Transmission Friction Elements", in *Design Practices–Passenger Car Automatic Transmissions*, (second edition), (Warrendale, PA, SAE, 1973), pp. 106–117, 1973.
*Petersen's Circle Track*, (Aug. 1984), pp. 41 and 60.
*Stock Car Racing*, (Apr. 1983), pp. 18, 31 and 54.

*Primary Examiner*—Leslie A. Braun
*Assistant Examiner*—Richard M. Lorence
*Attorney, Agent, or Firm*—Gravely, Lieder & Woodruff

[57] ABSTRACT

A clutch for an automotive vehicle has a driving member which is connected to the crankshaft of the vehicle engine, and a driven member which is keyed, by means of a spline, to the input shaft of the vehicle transmission, there being a spring at the end of the shaft for urging the second member toward the transmission. The first member includes a mounting ring and an end ring, as well as posts extended between the two rings. The end ring contains cutouts arranged in two rows around the shaft and a groove separating the rows. The second member has a hub against which the spring bears and a larger transfer ring at one end of the hub. The transfer ring in turn has lugs arranged in two rows around its periphery, and these lugs are configured to slide into the cutouts in the end ring of the driving member under the force exerted by the spring. Located around the hub of the driven member is a stack of first and second clutch plates arranged alternately between the mounting ring of the driving member and the transfer ring of the second member. The first clutch plates are keyed to the posts of the first member, whereas the second clutch plate is keyed to a spline on the hub of the driven member. The clutch has two engaged conditions and a single disengaged condition. In the first engaged position the lugs are in the cutouts; in the second engaged position the plates are compressed tightly together; and in the disengaged position the lugs are withdrawn from the cutouts and the plates slip with respect to each other.

21 Claims, 3 Drawing Sheets

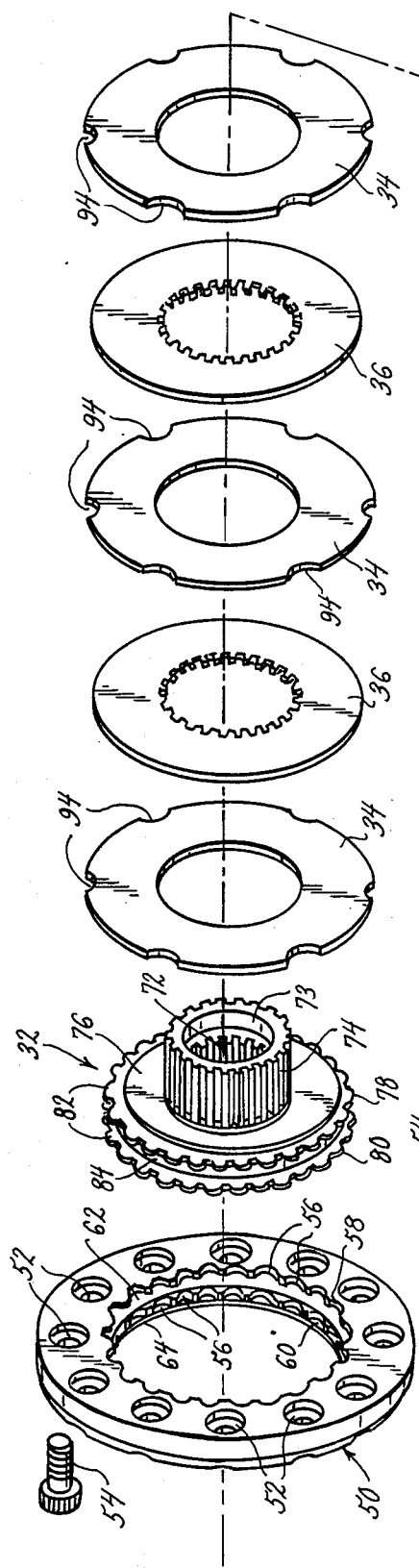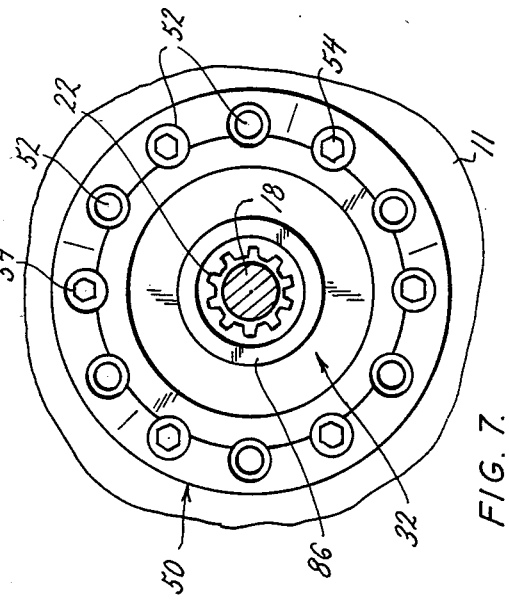

CLUTCH FOR AUTOMOTIVE VEHICLES

BACKGROUND OF THE INVENTION

This invention relates in general to clutches and, more particularly, to clutches for the drive trains of automotive vehicles.

The drive train of the typical automobile equipped with a manual transmission includes a clutch interposed between the engine and the transmission to, of course, engage and disengage the engine from the drive wheels and to facilitate the change of gearing in the transmission. The clutch used almost universally on automobiles of current manufacture has a pair of friction surfaces—one on the flywheel and the other on a pressure plate that is carried by the flywheel—and a clutch disk which is located between the friction surfaces. The flywheel and the pressure plate, of course, rotate with the crankshaft of the engine, and the latter is biased toward the former under a force exerted by a spring, so that the clutch normally assumes an engaged condition in which the disk is clamped between the friction sufaces on the flywheel and pressure plate. However, by depressing a clutch pedal, the operator can withdraw the pressure plate against the bias of its spring and thereby disengage the clutch disk from the rotating friction surfaces of the flywheel and pressure plate. The clutch disk is carried by a splined shaft, which extends from the transmission and indeed constitutes the power input shaft for the transmission, so when the clutch pedal is depressed, the engine is disengaged from the transmission and the drive wheels located beyond it.

While the conventional clutch is quite suitable for automobiles operated under normal driving conditions, it does not lend itself to the rigors of automobile racing. In the first place, the conventional clutch concentrates much of the clutch mass a substantial distance from the axis of the crankshaft and thus produces a relatively high moment of inertia which retards acceleration. As a consequence, the engine does not respond as quickly to the accelerator as it might otherwise. Secondly, the conventional clutch relies solely on friction to transfer the power from the engine to the transmission, but the engines for racing vehicles develop considerably more torque than conventional engines—torque which is utilized in the demands of racing. Often the torque exceeds the ability of the friction surfaces to resist it, and the clutch slips. The problem is particularly acute in dirt track racing where the vehicles encounter irregular surfaces which impose substantial variances in the torque demanded from the engine.

The limitations of conventional clutches have lead to the development of specialized clutches designed specifically for racing. A typical clutch of this character transmits the torque from the engine through both a friction coupling and also through a direct connection. The former is called upon to set the vehicle in motion, whereas the latter is used during continued operation. This type of clutch may likewise be controlled with a clutch pedal, but the pedal operates somewhat differently, in that its neutral or disengaged position is intermediate its fully depressed and fully released positons. Indeed, when the pedal is fully depressed, the clutch engages through its friction surfaces, and when fully released, it engages through its direct coupling. This type of clutch may also be controlled by a hand apparatus.

One racing clutch of this variety utilizes a single pressure plate and clutch disk and calls upon them to transmit the full torque during acceleration as the vehicle is set in motion. This places severe demands on those components. Moreover, the clutch is about as large as a conventional clutch, and thus has a high moment of inertia. Another variety is somewhat smaller, and it has conical friction surfaces that is a cone clutch, for the initial engagement to set the vehicle in motion. But cone clutches have little surface area and wear out more rapidly than disk-type clutches.

The present invention resides in an automobile clutch that utilizes a plurality of friction plates arranged in a stack to initially engage an engine with its transmission. It also has lugs and cutouts arranged in two circular rows. When the lugs engage the cutouts, a direct coupling exists through the clutch, so that torque is transmitted without any slippage.

DESCRIPTION OF THE DRAWINGS

In the accompanying drawings which form part of the specification and wherein like numerals and letters refer to like parts wherever they occur

FIG. 7 is an end view of the clutch taken along line 7—7 of FIG. 3; and

FIG. 8 is an exploded perspective view of the clutch.

DETAILED DESCRIPTION

Figure 1:
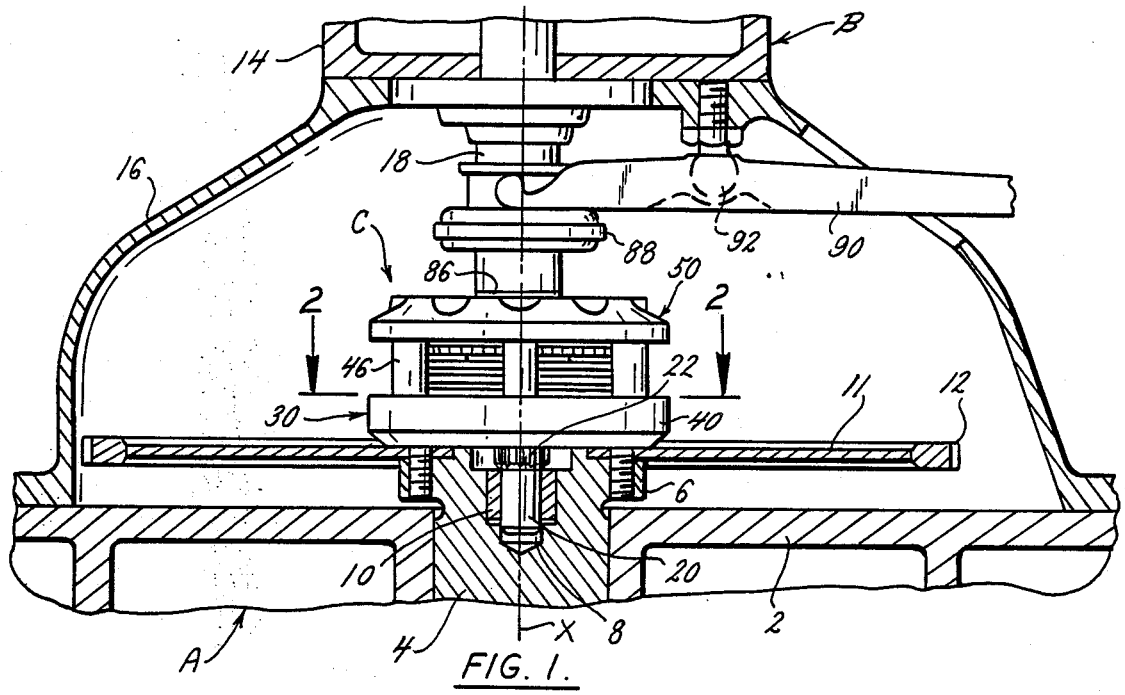
- FIG. 1 is a sectional view showing the clutch of the present invention located within a clutch housing and coupled between the crankshaft of the engine and the input shaft of a transmission.

Referring now to the drawings (FIG. 1), an internal combustion engine A is coupled to a transmission B through a clutch C which, when operated, engages or disengages the engine from the transmission. The clutch C has two modes of engagement—one through friction surfaces and the other by interlocking components of the clutch C so that no slippage between the engine A and transmission B occurs.

Figures 2, 3:
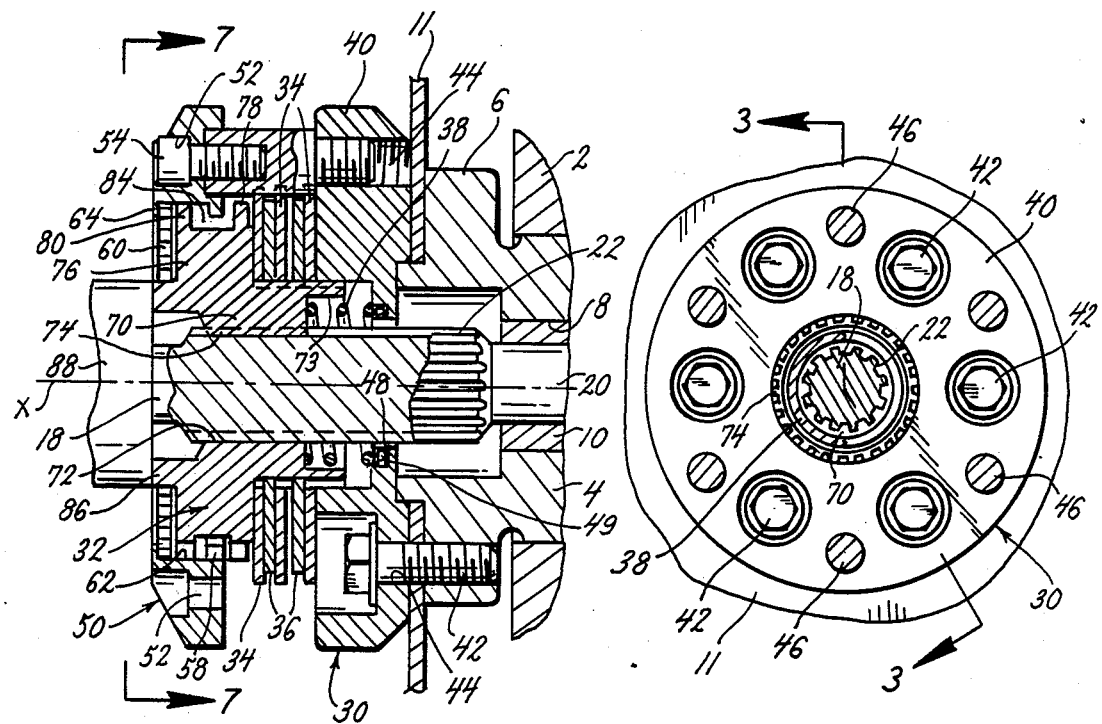
FIG. 2 is a sectional view of the clutch taken along line 2—2 of FIG. 1.
FIG. 3 is a sectional view of the clutch taken along line 3—3 of FIG. 2 and showing the clutch in its disengaged condition.

The engine A has a block 2 and a crankshaft 4 which rotates within the block 2 (FIG. 1). The crankshaft 4 projects from the block 2 where it is provided with a coupling member 6 having at its center a socket 8, which in effect opens axially out of the end of the shaft 4. The socket 8 contains a pilot bearing 10 which may be a sleeve bearing or needle bearing. Bolted against the coupling member 6 is a lightweight flex plate 11 to which a ring gear 12 is attached, with the ring gear 12 being located where it will be engaged by the pinion gear of a starter motor. The transmission B has a case 14 which is attached to the block 2 of the engine A through a bell-shaped clutch housing 16. Projecting from the transmission case 14 and through the clutch housing 16 to the coupling member 6 at the end of the crankshaft 4 is an input shaft 18 through which the engine A delivers power to the gears of the transmission B. At its end, the shaft 18 has a pilot 20 which fits into and rotates within the pilot bearing 10 of the crankshaft 4. Thus, the crankshaft 4 of the engine A and the input shaft 18 of the transmission B rotate about a common axis X of rotation. Immediately beyond the pilot 20, in the region of the flex plate 11 and beyond, the shaft 18 carries a spline 22 (FIG. 3). Thus, the shaft 18 is confined at its remote end by the pilot bearing 10, whereas at its opposite end, it is confined by bearing within the transmission case 14. The clutch C fits around the input shaft 18 at the spline 22, and as such is contained within the clutch housing 16, where it likewise rotates about the axis X (FIG. 1). Generally speaking, the engine A and the transmission B are conventional, as is the clutch housing 16. The clutch C is not.

Figure 4:
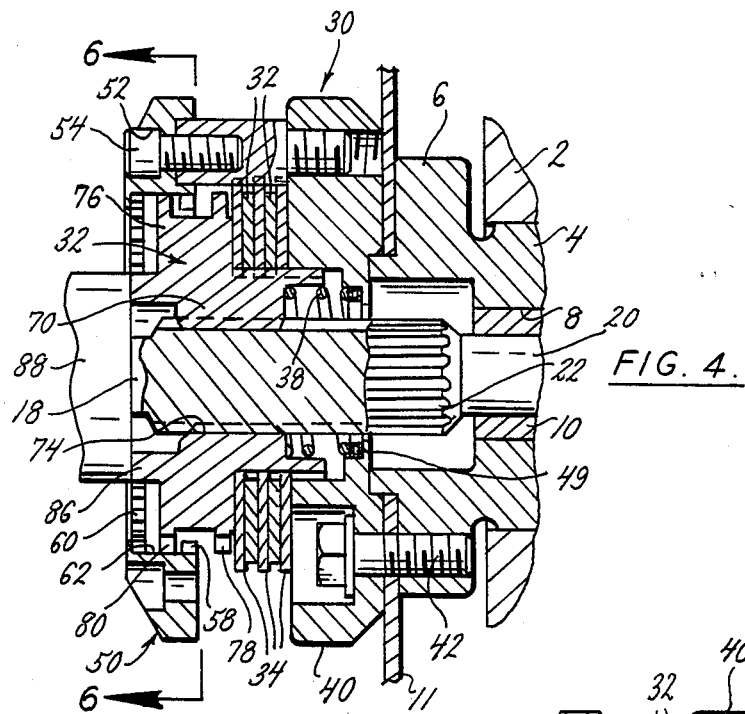
FIG. 4 is a sectional view similar to FIG. 3, but showing the driving member and driven member coupled through contacting clutch plates.
Figure 5:
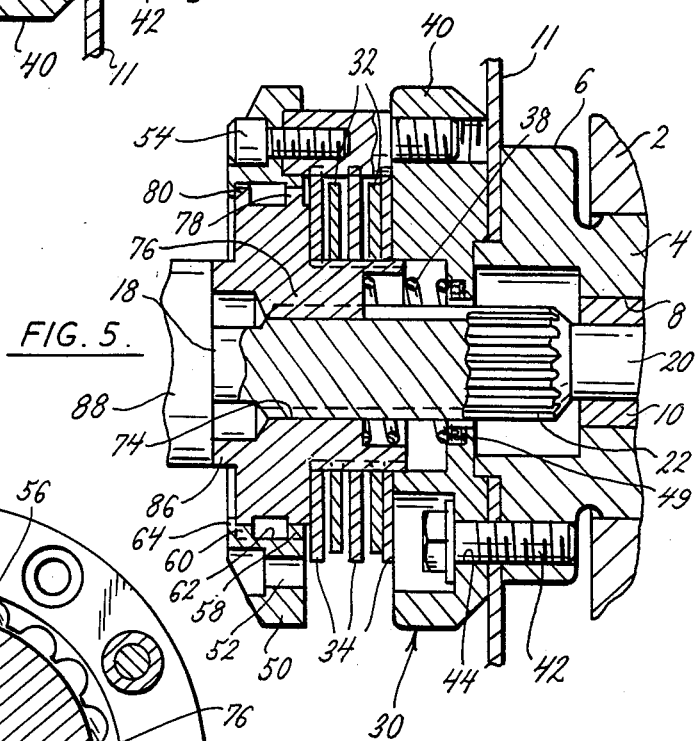
FIG. 5 is a sectional view similar to FIG. 3, but showing the driving member and the driven member interlocked at lugs and cutouts.

Basically, the clutch C includes (FIG. 3) a driving member 30, which is attached to and rotates with the coupling member 6 of the crankshaft 4 and a driven member 32, which is connected to the input shaft 18 of the transmission B at the spline 22. The clutch C, of course, has a disengaged position wherein the input shaft 4 of the transmission is disconnected from the crankshaft 4 of the engine A, a condition in which the driving member 30 of the clutch C rotates relative to the driven member 32 (FIG. 3). The clutch C is also capable of assuming an engaged condition—indeed, two engaged conditions—in which the driven member 32 is coupled to the driving member 30, and thus rotates with the driving member 30, enabling the crankshaft 4 to transmit torque to the input shaft 18 of the transmission B. In the first engaged condition, the driving and driven members 30 and 32 are coupled through abutting friction surfaces on clutch plates 34 and 36 (FIG. 4). In the second engaged condition, they are coupled by interlocking lugs and cutouts on the members 30 and 32 so that a positive, that is a nonslip, coupling exists (FIG. 5). As the clutch C changes from its disengaged condition to either of its engaged conditions, its driven member 32 moves axially along the spline 22 of the input shaft 18, remaining coupled with that shaft such that the two always rotate in unison. Located around the input shaft 18 is a coil-type compression spring 38 which bears against driven member 32 of the clutch C and urges that member to its second engaged condition in which the two members 30 and 32 are locked together.

The driving member 30 includes (FIGS. 3 and 8) a mounting ring 40 which is fastened securely to the coupling member 6 and against the flex plate 11 by bolts 42 that thread into the coupling member 6. In this regard, the mounting ring 40 possesses holes 44 which align with corresponding holes in the flex plate 11 and threaded holes in coupling member 6. Moreover, the holes 44 in the ring 40 are counterbored, with the counterbores so formed being deep enough to completely receive the heads of the bolts 42. The ring 40 fits around the input shaft 18 of the transmission B and near its periphery is provided with axially directed posts 46 arranged equidistantly from the axis X at equal circumferential intervals. Indeed, the posts 46 are located generally between the holes 44 through which the bolts 42 pass. The posts 46 are circular in cross-section and of equal length. At its center the ring 40 has a shallow counterbore 48 which opens toward the transmission B and contains a ball thrust bearing 49 against which one end of the spring 38 bears.

In addition to the mounting ring 40 and its posts 46, the driving member 30 includes an end ring 50 (FIGS. 3 and 8) having bolt holes 52 which align with the posts 46 on the mounting ring 40. Actually, the bolt holes 52 are counterbored at the back face of the ring 50 to receive the ends of the posts 46, and this precisely locates the end ring 50 with respect to the mounting ring 40. The end ring 50 is fastened securely to the posts 46 by more bolts 54 which pass through the holes 52 and thread into the posts 46.

Figure 6:
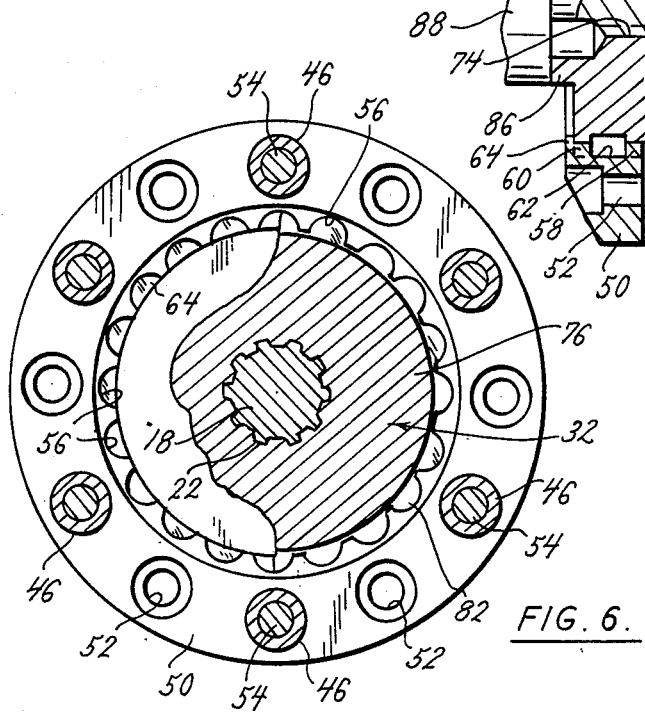
FIG. 6 is a sectional view taken along line 6—6 of FIG. 4 and showing the transfer ring of the driven member interlocked with the end ring of the driving member.

The end ring 50 along its inner face, that is the face which is presented toward the axis X, has arcuate cutouts 56 arranged in two rows 58 and 60, and a groove 62 separating the two rows 58 and 60 (FIGS. 3, 6 and 8). Indeed, the row 58 of cutouts 56 lies along that end face of the ring 50 which is presented toward the mounting ring 40, while the other row 60 lies along the other end face. At the latter end face, a thin lip 64 extends over each cutout 56 of the row 60, so that the cutouts 56 are barely discernible from that end of the ring 50. The rows 58 and 60 possess the same diameter and the same number of cutouts 56. Moreover, the cutouts 56 in the two rows 58 and 60 align. The groove 62 is somewhat deeper than the two rows 58 and 60 of cutouts 56, so that the surface which forms its base lies at a slightly greater diameter than the greatest diameter of the rows 58 and 60, which, of course, is defined by the farthest radial extension of the cutouts 56. Thus, the cutouts 56 do not extend outwardly into the base of the groove 51.

Turning now to the driven member 32, it fits into the driving member 30, generally within the space circumscribed by the posts 46. It includes (FIGS. 3 and 8) a hub 70 having a bore 72, which fits around the input shaft 18 and indeed is configured to engage the spline 22 on the input shaft 18. This causes the hub 70—and indeed the entire driven member 32—to rotate with the input shaft 18 about the axis X, yet enables the driven member 32 to move axially along the input shaft 18. The hub 70 extends to one end of the driven member 32, and at this end it is provided with a counterbore 73 into which the spring 38 fits. Here the spring 38 bears against the hub 70, urging the driven member 32 axially toward the end ring 50. On its outwardly presented surface, the hub 70 is provided with a spline 74. The clutch plates 34 and 36 fit around the hub 70 with only the latter being keyed to the spline 74 so as to rotate with the hub 74 and input shaft 18.

The driven member 32 also includes a transfer ring 76 (FIGS. 3 and 8) which is formed integral with the hub 70 at one end of the hub 70, and indeed, the bore 72 also extends through the ring 76 where it is likewise configured to engage the spline 22 on the input shaft 18. At its ends, the ring 76 has rows 78 and 80 of arcuate lugs 82, and between the rows 78 and 80, it is provided with a groove 84, the base of which is set radially inwardly from the lugs 82 in the two rows 78 and 80. The lugs 82 of the row 78 are equal in number and correspond in configuration to the lugs 82 in the row 80, and further axially align with the lugs 82 in the row 80. Moreover, the arcuate lugs 82 of the two rows 78 and 80 correspond in number, diameter, and configuration to the arcuate cutouts 56 in the two rows 58 and 60 of cutouts 56 located in the end ring 50 of the driving member 30. Aside from that, the axial spacing between the rows 78 and 80 of lugs 82 equals the axial spacing between the two rows 58 and 60 of cutouts 56 in the end ring 50.

The arrangement is such that the arcuate lugs 82 in the rows 78 and 80 on the transfer ring 76 will fit into the cutouts 56 in the rows 58 and 60, respectively, of the end ring 50, to engage the two ring 50 and 76, so that the driving member 30 and driven member 32 are positively interlocked to rotate in unison (FIG. 5). Indeed, it is this position that the two rings 50 and 76 assume with respect to each other when the clutch C is in the second of its two engaged conditions, that is, the one where the driving member 30 and driven member 32 are coupled directly together, that is interlocked. The spring 38, which bears against the hub 70, urges the ring 76 of the driven member 32 into its interlocked condition with respect to the end ring 50 of the driving member 30. The lips 64, which cover the cutouts 56 in the row 60 of the end ring 50, prevent the spring 38 from forcing the transfer ring 76 beyond the position in which the lugs 82 of its two rows 98 and 80 fully engage the cutouts 56 in the two rows 58 and 60 of the end ring 50, so the spring 38 will maintain the clutch C in its interlocked condition, unless the spring 38 is compressed by an externally applied force.

That external force is exerted on a nose 86, which is formed integral with the transfer ring 76, projecting axially from it in the direction opposite to that of the hub 70 (FIGS. 3 and 7). To this end, the input shaft 18 of the transmission B carries a conventional clutch release bearing 88 (FIG. 1), which bears against the nose 86 at the end of the driven member 32, and the bearing 88 is in turn coupled to a fork 90, which pivots about a pivot member 92 attached to the clutch housing 16. The fork 90, through a suitable linkage, is connected to the clutch pedal in the driver's compartment of the vehicle.

Through the fork 90, an axially directed force is exerted on the clutch release bearing 88, and that bearing transfers the force to the driven member 32, causing it to move axially along the input shaft 18 against the bias of the spring 38. After a short distance of a magnitude of about ¼ inch, the arcuate lugs 82 in the row 80 on the transfer ring 76 move out of the arcuate cutouts in the row 60 of the end ring 50, while simultaneously, the lugs 82 in the row 78 on the transfer ring 76 move out of the cutouts 56 in the row 58 on the end ring 50, thus disengaging the driven member 32 from the driving member 30 (FIG. 3). Indeed, the lugs 82 in the row 80 on the transfer ring 76 move into the groove 62 between the two rows 58 and 60 of cutouts 56 in the end ring 50, whereas the groove 84 between the two rows 78 and 80 of lugs 82 in the transfer ring 76 locates opposite the row 58 of cutouts 56 in the end ring 50. In short, the lugs 82 on the driven member 32 are offset axially with respect to the cutouts 56 in the driving member 30. When the driving and driven members, 30 and 32, are in this position relative to each other, the clutch C is in its neutral or disengaged condition, but it will not remain in that condition without the force exerted on the driven member 32 through the fork 90 and clutch release bearing 88.

The annular clutch plates 34 and 36 fit around the hub 70 of the driven member 32 where they form a stack which is confined axially between the mounting ring 40 of the driving member 30 and the transfer ring 76 of the driven member 30 (FIG. 3). Within the stack the plates 34 and 36 are arranged alternately, but the plates 34 exceed the plates 36 by one, for a plate 34 lies against a pressure surface on the mounting ring 40 and another plate 34 lies against a pressure surface on the transfer ring 76, these pressure surfaces being perpendicular to the axis X. Moreover, the depth of the stack of plates 34 and 36 is such that it prevents the transfer ring 76 from moving very far beyond the neutral or desengaged portion, that is the position in which the row 80 of lugs 82 on the transfer ring 76 lies within the groove 62 between the rows 58 and 60 of cutouts 56 in the end ring 50. As such, the stack of plates 34 and 36 prevents the lugs 82 of the second row 80 on the transfer ring 76 from entering the first row of cutouts 56 in the end ring 50 (FIG. 4).

The clutch plates 34 extend outwardly past the innermost surfaces of the posts 46 on the driving member 30 and are provided with arcuate notches 94 (FIG. 8) which open radially outwardly to accommodate the posts 46. Thus, the posts 46 serve to confine the plates 34 within driving member 30. Moreover, the notches 94 enable the plates 34 to engage the posts 46, so that the plates 34 will not rotate relative to the driving member 30, yet can move axially with respect to the posts 46. Thus, the plates 34 rotate at precisely the same angular velocity as the driving member 30, which is connected to the crankshaft 4.

The clutch plates 36, on the other hand, have a diameter less than the innermost circle circumscribed by the posts 46 on the driving member 30, so they are free to rotate about the axis X relative to the driving member 30. The clutch plates 36, however, are keyed to the spline 74 on the hub 70 of the driven member 32, so that while they may move axially along the hub 70, they cannot rotate relative to it. In short, the plates 36 rotate with hub 70 at precisely the same velocity as the driven member 32.

When the force exerted on the driven member 36 at the clutch release bearing 88 exceeds that required to hold the driven member 32 in its neutral or disengaged position, the stack of plates 34 and 36 is compressed and, of course, friction develops between the alternate plates 34 and 36 (FIG. 4). Since the plates 34 are engaged with the driving member 30 and the plates 36 are keyed to the driven member 32, the rotation of the former is imparted to the latter, with the amount of slippage being dependent on the force exerted through the clutch release bearing 88.

The operation of the clutch C begins with the clutch C in its neutral or disengaged condition (FIG. 3), the condition in which the driven member 32 is positioned with the driving member 30 such that the rows 78 and 80 of lugs 82 on the former are offset axially with respect to the rows 58 and 60 of cutouts 56 in the latter, yet the stack of clutch plates 34 and 36 is loose between the mounting 40 of the driving member 30 and the transfer ring 76 of the driven member 32. When the crankshaft 4 rotates in this condition, driving member 30 merely revolves around the driven member 32, although for the sake of safety, the transmission B should also be in neutral. To achieve this disengaged position, the operator of the vehicle depresses the clutch pedal partially and maintains it in this position against the restoring force exerted by the spring 38.

With the engine A running, the operator sets the vehicle in motion by fully depressing the clutch pedal. This forces the driven member 32 forwardly within the driving member 30, and as a consequence, the stack of clutch plates 34 and 36 is compressed between the mounting ring 40 of the driving member 30 and the transfer ring 76 of the driven member 32 (FIG. 4). Friction develops between the plates 34 and the plates 36, and by reason of this friction, the plates 36, which are keyed to the driven member 32, begin to rotate with the plates 34, which are interlocked with the driving member 30. The rotation of the driving member 30 is thus imparted to the driven member 32.

After the vehicle reaches a moderate speed at which no slippage occurs between the clutch plates 34 and 36, the operator releases the clutch pedal, allowing the spring 38 to drive the driven member 32 rearwardly over the spline 22 on the input shaft 18 of the transmission B, whereupon the clutch plates 34 and 36 separate. This momentarily disengages the driven member 32 from the driving member 30. But, after this momentary disengagement, the lugs 82 of the two rows 78 and 80 on the transfer ring 76 of the driven member 32 enter the cutouts 56 in the two rows 58 and 60 of the driving member 30, thereby interlocking the driven member 32 with the driving member 30 (FIG. 5). The two rotate in unison, so that the torque developed at the crankshaft 4 is transferred directly through the clutch B, without slippage, to the input shaft 18 of the transmission B. The lips 64 on the last row 60 of cutouts 56 prevent the spring 38 from forcing the driven member 32 any further and this serves to maintain the driven member 32 in its interlocked condition.

When the time comes to change gears within the transmission B, the operator merely depresses the clutch pedal about halfway to shift the driving member 32 such that the rows 78 and 80 of lugs 82 on the transfer ring 76 are offset from the rows 58 and 60 of cutouts 56 in the end ring 40 of the driving member 30 without compressing the stack of clutch plates 34 and 36 (FIG. 3). This places the clutch C in its desengaged condition—a condition in which a gear change in the transmission B may be effected with ease. Then the operator again releases the clutch pedal to enable the spring 38 to drive the driven member 32 back to the engaged position in which the lugs 82 on its transfer ring 76 fit into the cutouts 56 in the end ring 50 of the driving member 30 (FIG. 5).

To install the clutch between the engine A and the transmission B, the mounting plate 40 of the driving member 30 is bolted against the starter gear 12 with the bolts 42 which thread into the coupling member 6 at the end of the crankshaft 4. This requires that the end ring 50 be detached from the posts 46. Next, the thrust bearing 49 is inserted into the counterbore 48 of the mounting ring 48.

As to the driven member 36, the clutch plates 34 and 36 are placed as a stack over its hub 70, and then, with the end ring 50 of the driving member 30 still detached, the driven member 32, with its stack of plates 34 and 36 presented forwardly toward the mounting ring 40 and the spring 38 projecting from the counterbore 73 of its hub 70, is inserted into the space circumscribed by the posts 46 of the driving member 30. In so doing, the notches 94 in the periphery of the clutch plates 34 are engaged with the posts 46. The spring 38 comes against the thrust bearing 49, and indeed must be compressed. The end ring 50 is then fitted over the transfer ring 76 of the driven member, this being possible by reason of the fact that the arcuate lugs 82 in the second row 80 on the transfer ring 76 are designed to pass through the cutouts 56 in the first row 58 on the end ring 50. In any event, the counterbores at the ends of the holes 52 in the end ring 50 are aligned with the ends of the posts 46, and the end ring 50 is seated on the posts 46. The bolts 54 are then inserted through the holes 52 and threaded into the posts 46.

Thereafter, the transmission B, with the clutch housing 16 attached to it, is maneuvered such that its input shaft 18 fits through the bore 72 in the driven member 32 and is advanced until the pilot 20 in the end of the shaft 18 passes into the pilot bearing 10 in the socket 8 at the end of the crankshaft 4.

The clutch may have more than the five plates 34 and 36 which are illustrated. For example, it may have seven plates 34 and 36.

This invention is intended to cover all changes and modifications of the example of the invention herein chosen for purposes of the disclosure which do not constitute departures from the spirit and scope of the invention.

What is claimed is:

1. A clutch for connecting machine components that are capable of rotating about a common axis of rotation, said clutch comprising: a first member located along the axis and having a pressure surface oriented at an angle with respect to the axis; a second member also located along the axis and having a pressure surface which is also oriented at an angle with respect to the axis and is further spaced axially from the pressure surface of the first member, the second member being movable axially with respect to the first member between a disengaged position and first and second engaged positions, one of the members having cutouts arranged in two circumferential rows located around the axis and spaced axially apart and the other member having lugs arranged in two circumferential rows around the axis, the lugs fitting into the cutouts when the second member is in its first engaged position, whereby the first and second members interlock and hence rotate together, the lugs of one of the rows being in the space between the two rows of cutouts when the second member in the disengaged position, the pressure surfaces on the first and second members being arranged such that they approach each other as the second member is moved from its disengaged position to its second engaged position; and a stack of first and second plates arranged alternately around the axis and between the pressure surfaces of the first and second members and being clamped tightly together when the second member is in its second engaged position; the first clutch plates being keyed to the first member such that they will rotate with the first member, yet can shift axially with respect to it, the second clutch plates being keyed to the second member such that they rotate with it, yet can shift axially with respect to it, whereby when the second member is in its disengaged position, the first plates slip with respect to the second plates, but when the second member is in its second engaged position, the friction between the clamped together first and second plates causes the plates to rotate together and thus transfer torque between the members.

2. A clutch according to claim 1, wherein the disengaged position for the second member is located intermediate the first and second engaged positions.

3. A clutch according to claim 1 wherein the second member is located generally within the first member.

4. A clutch according to claim 3 wherein the first member has a pair of rings located around the axis and spaced axially apart: and wherein the pressure surface for the first member is on one of the rings and the rows of cutouts are on the other ring.

5. A clutch according to claim 4 wherein the first member has posts extended between the two rings to maintain the rings in fixed and determined relation with respect to each other.

6. A clutch according to claim 5 wherein in the first clutch plates are keyed to the posts of the first member.

7. A clutch according to claim 4 wherein the second member includes a hub and a transfer ring attached to the hub; wherein the clutch plates encircle the hub with the second plates being keyed to the hub; and wherein the pressure surface for the second member and the rows of lugs are on the transfer ring.

8. A clutch according to claim 1 wherein the first member has the cutouts and the second member has the lugs; and wherein the first member has lips over at least some of the cutouts to prevent the lugs on the second member from the passing axially through the cutouts.

9. A clutch according to claim 1 wherein the member with the cutouts has a groove between the two rows of cutouts; and wherein one of the rows of lugs is in the groove between the rows of cutouts when the second member is in its disengaged condition.

10. A clutch comprising: a first member located along an axis of rotation and having the first and second rings and means extended between the rings for connecting the rings and holding them in a fixed and determined position with respect to each other, the first ring having a pressure surface, which is presented toward the second ring, the second ring having cutouts arranged in two circumferential rows around the axis and further having a groove between the two rows; a second member located around the axis generally within the first member and having a hub and a transfer ring at one end of the hub, with the transfer ring being greater in diameter than the hub, the second member being shiftable axially with respect to the first member between a disengaged position and first and second engaged positions, with the disengaged position being located intermediate the two engaged positions, the transfer ring having a pressure surface which is presented toward the pressure surface on the first ring of the first member, the transfer ring also having lugs, which are arranged in two circumferential rows around the axis and are configured to fit into the cutouts in the second ring of the first member when the second member is moved to its second engaged position so as to interlock the first and second members for rotation in unison, the lugs of the two rows being removed from the cutouts of the two rows and the lugs of one of the rows being in the groove between the two rows of cutouts when the second member is in its disengaged position; and first and second clutch plates arranged alternately around the hub of the second member and between the pressure surfaces of the first and second members, when the first plates being keyed to the first member and the second plates being keyed to the second member, such that the clutch plates can separate slightly and move together, the clutch plates being separated slightly when the second member is in its disengaged and second engaged position, but being clamped tightly between the pressure surfaces on the first and second members when the clutch is in its first engaged position.

11. A clutch according to claim 10 wherein the means connecting the rings are posts that extend between the first and second rings of the first member and the first clutch plates are keyed to the first member at the posts.

12. A clutch according to the claim 11 wherein the hub of the second member has a spline, and the second clutch plates are keyed to the second member at the spline.

13. The combination comprising: the clutch of claim 10, an engine having a crankshaft to which the first ring of the first member is attached: a transmission mounted in a fixed position with respect to the engine and having an input shaft which extends through and is keyed to the second member.

14. The combination according to claim 13 wherein the crankshaft of the engine has a socket into which the input shaft of the transmission fits; and further comprising a coil-type compression spring bearing against the second member of the clutch to urge the second member to its second engaged position.

15. The combination according to claim 14 and further comprising a clutch-release bearing on the input shaft at that end of the second member which is opposite from the spring; and means for exerting a force on the bearing in opposition to the force exerted by the spring so as to move the second member to its disengaged and first engaged positions.

16. A clutch for connecting members that are capable of rotating about a common axis of rotation, said clutch comprising: a first member located along the axis; a second member also located along the axis and being movable axially with respect to the first member between a disengaged position and first and second engaged positions; one of the members having cutouts arranged in a circumferential row around the axis and the other member having lugs arranged in a circumferential row around the axis, the lugs fitting into the cutouts when the second member is in its first engaged position to interlock the first and second members so that they rotate together, the member having the cutouts further having lips which extend over at least some of the cutouts to prevent the lugs on the other member from passing axially through the cutouts; and first and second friction surfaces carried by the first and second members, respectively, such that they do not rotate with respect to the members on which they are carried, the first and second friction surfaces being positioned such that they will slip relative to each other when the second member is in its disengaged position, the first and second friction surfaces firmly abutting when the second member is in its second engaged position so that torque will be transferred from one member to the other member at the abutting friction surfaces.

17. A clutch for connecting machine components that are capable of rotating about a common axis of rotation, said clutch comprising: a first member located along the axis; a second member also located along the axis and being movable axially with respect to the first member between a disengaged position and first and second engaged positions; one of the members having cutouts arranged in at least two circumferential rows around the axis with a space between the rows, the other member having lugs arranged in at least two circumferential rows around the axis, the lugs fitting into the cutouts when the second member is in its first engaged position so that the first and second members are interlocked and hence rotate together, the rows of lugs being removed from the rows of cutouts with one row of lugs being in the space between the rows of cutouts when the second member is in its disengaged position; and first and second friction surfaces carried by the first and second members, respectively, such that they do not rotate with respect to the members on which they are carried, the first and second friction surfaces being positioned such that they will slip relative to each other when the second member is in its disengaged position, the first and second friction surfaces firmly abutting when the second member is in its second engaged position so that torque will be transferred from one member to the other member at the abutting friction surfaces.

18. A clutch according to claim 17 wherein the disengaged position for the second member is located intermediate the first and second engaged positions.

19. A clutch according to claim 18 and further comprising a spring for urging the second member to its first engaged position and limit means for preventing the spring from moving the second member beyond its first engaged position.

20. A clutch according to claim 19 wherein the limit means include lips on the member having the cutouts, with the lips extending over at least some of the cutouts.

21. A clutch according to claim 17 wherein the one row of lugs is also in the space between the rows of cutouts when the second member is in its first engaged position.

* * * * *

UNITED STATES PATENT AND TRADEMARK OFFICE
CERTIFICATE OF CORRECTION

PATENT NO. : 4,907,685

DATED : MARCH 13, 1990

INVENTOR(S) : GARY A. LANDOLT

It is certified that error appears in the above-identified patent and that said Letters Patent is hereby corrected as shown below:

Column 9, line 52, after "members," change "when the" to "with the".

Signed and Sealed this

Fifth Day of March, 1991

Attest:

HARRY F. MANBECK, JR.

Attesting Officer

Commissioner of Patents and Trademarks